(12) United States Patent
Brown et al.

(10) Patent No.: US 8,865,082 B2
(45) Date of Patent: Oct. 21, 2014

(54) METHOD AND SYSTEM FOR MONITORING A HYDROCARBON ADSORBER

(75) Inventors: David B. Brown, Brighton, MI (US); Wei Li, Troy, MI (US)

(73) Assignee: GM Global Technology Operations LLC

( * ) Notice: Subject to any disclaimer, the term of this patent is extended or adjusted under 35 U.S.C. 154(b) by 1194 days.

(21) Appl. No.: 12/573,333

(22) Filed: Oct. 5, 2009

(65) Prior Publication Data

US 2011/0082031 A1  Apr. 7, 2011

(51) Int. Cl.
| | |
|---|---|
| *F01N 3/00* | (2006.01) |
| *F01N 11/00* | (2006.01) |
| *B01J 23/10* | (2006.01) |
| *B01D 53/72* | (2006.01) |
| *B01D 53/92* | (2006.01) |
| *B01D 53/94* | (2006.01) |
| *B01J 20/18* | (2006.01) |
| *B01J 20/32* | (2006.01) |
| *B01J 37/02* | (2006.01) |
| *B01D 53/30* | (2006.01) |
| *B01J 35/00* | (2006.01) |

(52) U.S. Cl.
CPC .............. *B01D 53/9445* (2013.01); *B01J 23/10* (2013.01); *B01D 2255/9027* (2013.01); *B01D 2255/912* (2013.01); *Y02T 10/22* (2013.01); *B01D 53/9495* (2013.01); *B01J 37/0244* (2013.01); *B01J 37/0246* (2013.01); *B01D 2255/50* (2013.01); *B01J 20/18* (2013.01); *B01J 20/3204* (2013.01); *B01D 2255/2065* (2013.01); *B01J 20/3238* (2013.01); *B01D 53/30* (2013.01); *B01D 2255/908* (2013.01); *B01J 35/0006* (2013.01); *Y10S 502/52712* (2013.01)
USPC ....... 422/168; 502/400; 502/304; 502/527.12

(58) Field of Classification Search
USPC .............. 502/400, 415, 407, 60, 64, 65, 304, 502/527.12; 422/168
See application file for complete search history.

(56) References Cited

U.S. PATENT DOCUMENTS

| | | | |
|---|---|---|---|
| 5,946,906 A | 9/1999 | Akazaki et al. | |
| 5,956,945 A | 9/1999 | Kumar et al. | |
| 6,151,547 A * | 11/2000 | Kumar et al. | 701/101 |
| 6,301,881 B1 | 10/2001 | Kumar | |
| 6,367,245 B1 | 4/2002 | Yasui et al. | |
| 6,756,336 B2 * | 6/2004 | Kasahara et al. | 502/65 |
| 8,041,501 B2 * | 10/2011 | Brown et al. | 701/109 |
| 2002/0082163 A1 * | 6/2002 | Yan et al. | 502/304 |
| 2003/0017603 A1 | 1/2003 | Uchida et al. | |
| 2006/0236678 A1 | 10/2006 | Tanada et al. | |

FOREIGN PATENT DOCUMENTS

CN  1187780(A)  7/1998

OTHER PUBLICATIONS

U.S. Appl. No. 12/397,798, filed Mar. 4, 2009, David B. Brown.

* cited by examiner

*Primary Examiner* — Anthony J Zimmer
*Assistant Examiner* — Diana J Liao

(57) ABSTRACT

A catalyst and method of forming the catalyst includes a catalyst body having hydrocarbon adsorber material and oxygen storage capacity material disposed thereon.

21 Claims, 9 Drawing Sheets

METHOD AND SYSTEM FOR MONITORING A HYDROCARBON ADSORBER

FIELD

The present disclosure relates to engine control systems, and more particularly to a system for monitoring a hydrocarbon adsorber.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Reduction of emission levels from internal combustion engines is increasingly being regulated. Hydrocarbons are one example of a regulated exhaust gas constituent. Active hydrocarbon adsorbers are an emerging technology that may help vehicles meet the increased regulations for exhaust gases. Typically, temperature sensors are used to indicate the functionality of the hydrocarbon absorber. The functionality check is a check of a bypass valve and of the thermal mass of the substrate. Providing a functional check of the hydrocarbon adsorber may not meet future regulations due to the limited information of a functional check.

SUMMARY

The engine control system according to the present disclosure provides a method for determining the health of a hydrocarbon adsorber.

In one aspect of the disclosure, a method includes applying an oxygen storage capacity material to a catalyst body and applying a hydrocarbon adsorber to the catalyst body.

In another aspect of the disclosure, a catalyst includes a catalyst body having hydrocarbon adsorber material and oxygen storage capacity material disposed thereon.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

DETAILED DESCRIPTION

Figure 1:
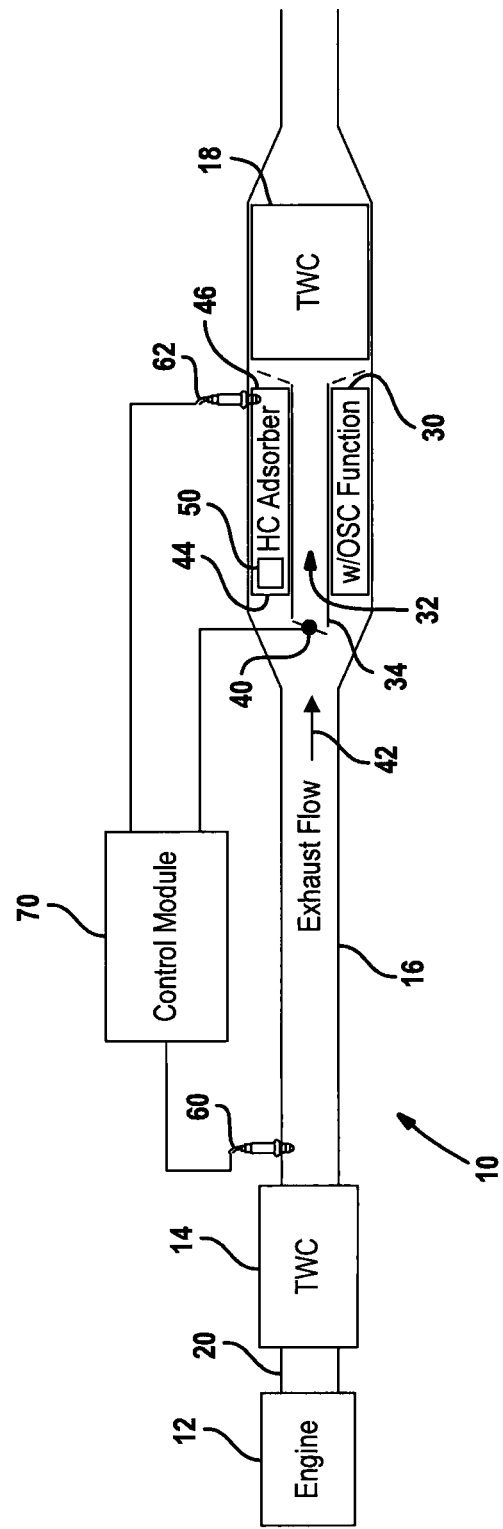
FIG. 1 is a functional block diagram of an engine control system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

The following disclosure is set forth using an oxygen sensor for measuring an exhaust gas constituent. However, other exhaust gas constituents may also be measured to verify the functionality of the hydrocarbon adsorber. The present disclosure is applicable to both active and passive HC adsorbers.

Referring now to FIG. 1, an exhaust system 10 in communication with an engine 12 is illustrated. The exhaust system 10 includes a first three-way catalyst 14, an exhaust conduit 16, and a second three-way catalyst 18. Exhaust gases from the engine 12 flow through an exhaust manifold 20 and into the exhaust system 10.

A hydrocarbon adsorber 30 is disposed between the first three-way catalyst 14 and the second three-way catalyst 18 within the exhaust conduit 16. The hydrocarbon adsorber 30 may be cylindrical in shape having a passage 32 therethrough. The passage 32 may be defined by a channel wall 34. A bypass valve 40 may be disposed within the passage 32. By opening and closing the bypass valve 40, the exhaust gases represented by arrow 42 may be directed through the passage 32 when open and thus substantially bypassing the hydrocarbon adsorber 30. When the bypass 40 is closed, blocking the passage 32, the hydrocarbon adsorber 30 receives exhaust gases 42.

The hydrocarbon adsorber 30 has a first end 44 which may be referred to as an inlet or upstream end. The first end 44 is disposed to first receive the exhaust gases 42. Thus, the first end 44, the hydrocarbon adsorber 30 is disposed toward the first three-way catalyst 14 and the engine 12. The second end 46 of the hydrocarbon adsorber 30 is disposed toward the outlet or downstream end of the exhaust conduit 16 toward the second three-way catalyst 18.

The hydrocarbon adsorber 30 may include material that has an exhaust gas constituent storage capacity function. In this disclosure, the exhaust gas constituent is oxygen and the hydrocarbon adsorber includes an oxygen storage capacity function. Oxygen storage capacity (OSC) material (or element) 50 is illustrated as a box within the hydrocarbon adsorber 44. However, the oxygen storage capacity material 50 may be disposed throughout the hydrocarbon adsorber 30. The oxygen storage capacity material 50 may have a thermal stability that degrades at a rate equal to or faster than that of the hydrocarbon adsorber 30. The oxygen storage capacity of the adsorber catalyst is correlated to emission performance. The OSC material 50 provides an oxygen buffer. Thus, the oxygen storage of the oxygen storage material may be measured to determine the health of the adsorber 30. Likewise, measurement of the oxygen storage capacity may allow for diagnostics of the functioning of the valve 40 in addition to the adsorber health. A lean-to-rich transition in the engine control and a time for changing the oxygen levels can be used to determine the adsorber health.

A first exhaust gas constituent sensor 60 is disposed within the exhaust conduit 16 and generates a first exhaust gas constituent signal corresponding to the exhaust gas constituent level within the exhaust conduit 16. In carrying forward with the present example, the exhaust gas constituent sensor may be an exhaust gas oxygen sensor.

An exhaust gas constituent sensor 62 may also be disposed within the hydrocarbon adsorber 30 to determine the level of storage of the exhaust gas constituent within the adsorber 30. Carrying forward with the present example, the exhaust gas constituent sensor 62 may be an oxygen sensor that generates a signal corresponding to the exhaust gas constituent within the hydrocarbon adsorber. The first exhaust gas constituent signal from the sensor 60 and the second exhaust gas constituent sensor signal from the exhaust gas sensor 62 are communicated to a control module 70. The control module 70 may also be in communication with the bypass valve 40 for controlling the opening and closing of the bypass valve. While the sensor 62 is illustrated within the adsorber, the sensor 62 may be located downstream of the adsorber such as before the TVVC 18 or after the TWC 18.

Figure 2:
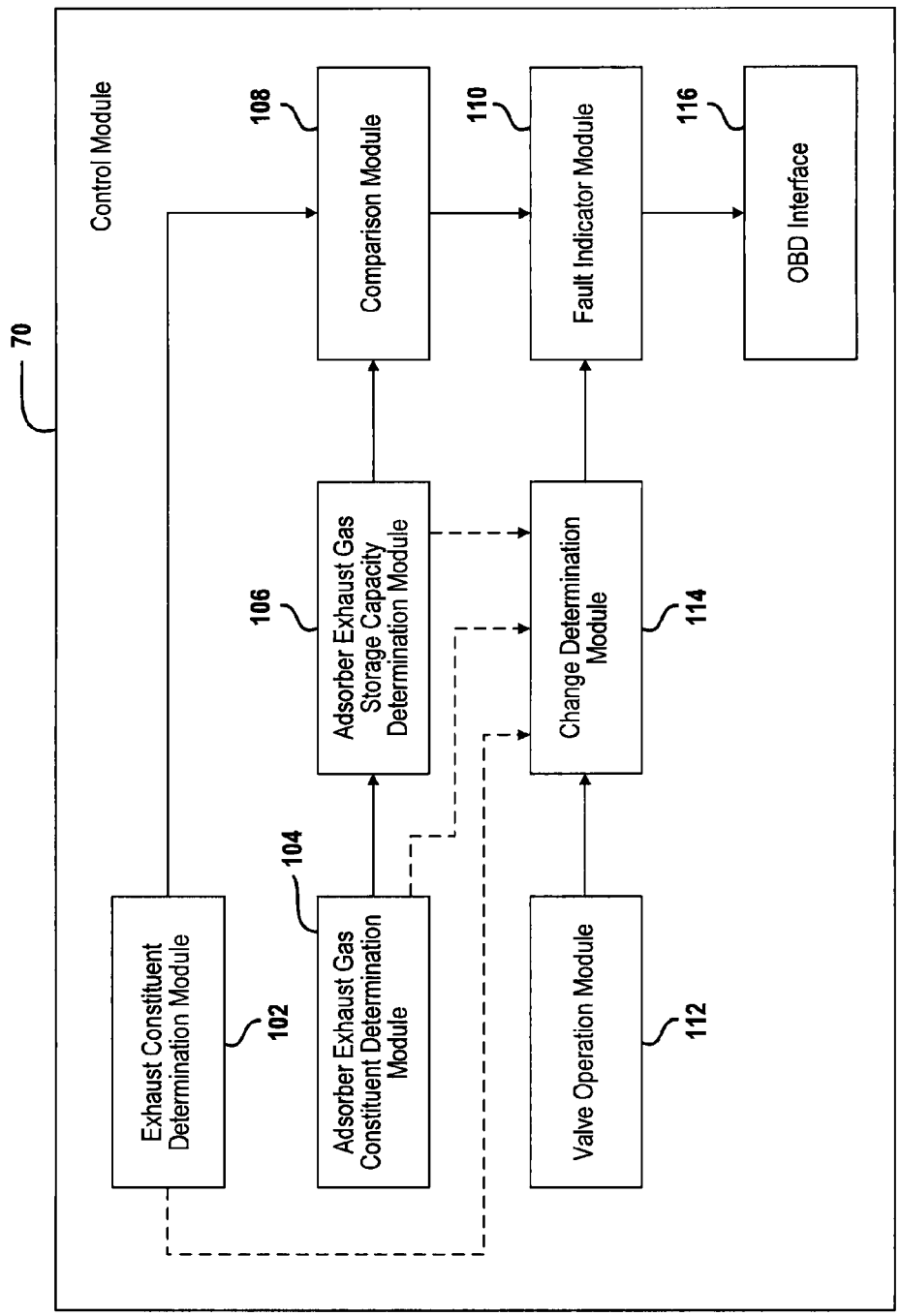
FIG. 2 is a block diagram of the control module of FIG. 1.

Referring now to FIG. 2, the control module 70 is illustrated in further detail. Control module 70 includes an exhaust gas constituent determination module 102 that may be in communication with the sensor 60 illustrated in FIG. 1. The exhaust gas constituent determination module 102 determines an exhaust gas constituent level for a particular exhaust gas constituent such as oxygen within the exhaust stream.

An adsorber exhaust gas constituent determination module 104 determines an amount of exhaust gas constituent within the adsorber. The sensor 62 may generate a signal used by module 104. The exhaust gas constituent signal from the exhaust gas constituent determination module 104 may be communicated to an adsorber exhaust gas storage capacity determination module 106. Again, the exhaust gas constituent storage capacity of the adsorber may be derived directly from the amount of exhaust gas constituent measured in the module 104 or from a time associated with a lean-to-rich transition as will be described below.

A comparison module 108 may receive the exhaust gas constituent signal from the exhaust gas constituent determination module 102. The comparison module 108 may receive the adsorber exhaust gas determination module signal from the adsorber exhaust gas constituent determination module 104 or the exhaust gas constituent storage capacity from the adsorber exhaust gas constituent storage capacity determination module 106. By comparing the amount of exhaust gas constituent within the exhaust with either the constituent storage capacity or the amount of exhaust gas stored within the adsorber, the comparison module may generate a fault at the fault indicator module 110. The comparison module 108 may subtract the exhaust gas constituent measured in module 102 with the exhaust gas constituent measured in module 104 and compare the difference with a threshold. In comparison to the threshold, the fault indicator module 110 may be actuated. Likewise, the comparison module 108 may also compare the exhaust gas constituent storage capacity 106 with the amount of exhaust gas constituent within the exhaust gas from the module 102. When the amount of exhaust gas storage capacity has been utilized by the exhaust gas constituent within the exhaust gas, the adsorber is operating properly. However, if an unexpected amount of storage capacity is available, the adsorber may not be functioning properly and the fault indicator module 110 may indicate a fault. As can be seen, a number of different methods may be determined based upon the exhaust gas constituent within the exhaust stream and the exhaust gas constituent within the adsorber. At a minimum, a comparison between the amount of exhaust gas within the adsorber and the exhaust gas stream is performed.

The comparison module 108 may also compare the time between a lean-to-rich transition between the first sensor 60 and the second sensor 62. If the time measured is greater than a time threshold then the adsorber is functioning properly (i.e., has enough oxygen storage capacity).

A bypass valve operation module 112 may also be included within the control module 70. The bypass valve operation module 112 may be in communication with a change determination module 114. The change determination module may also receive signals from the exhaust gas constituent determination module 102, the adsorber exhaust gas constituent determination module 104, or the adsorber exhaust gas constituent storage capacity determination module 106 or combinations thereof. The change determination module 114 may determine a change in the amount of exhaust gases or the amount of storage capacity of the exhaust gas constituent within the adsorber. The valve operation module 112 may open and close the valve and a change in the amount of constituent gases stored within the adsorber may be determined. In a similar manner to that described above, a difference between the amount of exhaust gases within the exhaust gas stream may be compared to the amount within an adsorber. This may be performed at two different times, including while the bypass valve is opened and closed. A difference between the opening and closing amounts of exhaust gases within the adsorber should be evident. If no change is evident, then the valve may not be operating properly. This may be performed by subtracting or comparing the closing and opening amount of constituent gases and comparing the difference with a threshold. If the difference is not above a threshold, the valve is not operating properly.

The fault indicator module 110 may be in communication with an on-board diagnostics (OBD) interface 116. The on-board diagnostics interface 116 may provide an interface to the on-board diagnostics system that may be located outside of the control module 70. The on-board diagnostic interface may provide fault codes or other fault signals in response to errors in the valve operation or in the adsorber.

Figure 3:
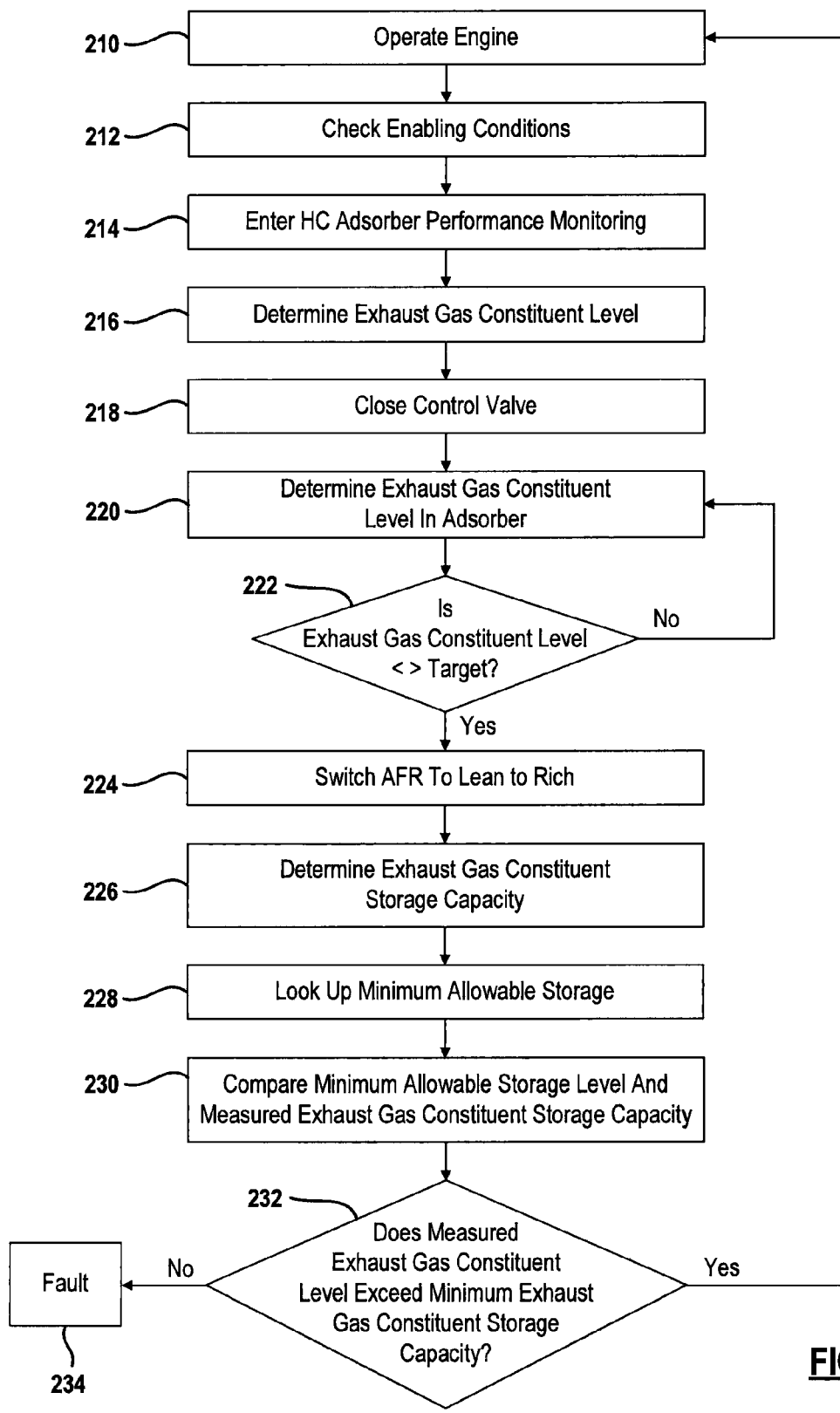
FIG. 3 is flow diagram depicting a method for monitoring a hydrocarbon adsorber.

Referring now to FIG. 3, a method of determining a fault of the adsorber is set forth. In step 210, the engine is operated. The diagnostic may be performed during regular operation. However, the diagnostic may also be performed during an enabling condition portion which may require the production of a certain amount of exhaust gas constituents in step 212. For example, the engine may be run in a rich condition, lean condition or other controlled manner such as during a lean-to-rich transition. Other enabling conditions may include run time and the temperature of the adsorber. In step 214, a hydrocarbon adsorber performance monitoring step is initiated. In step 216, the exhaust gas constituent level in the exhaust system is determined. This may be performed using the exhaust gas sensor 60 illustrated in FIG. 1. The time of a transition may be recorded. In step 218, the control valve may be closed. In step 220, the exhaust gas constituent level in the adsorber is determined. In step 222, if the exhaust gas constituent corresponds to an adequate capacity, step 224 switches the air fuel ratio from lean to rich. Step 226 determines the exhaust gas constituent storage capacity within the adsorber. This is directly determined from the exhaust gas constituent level from step 220. In step 228, a minimum allowable OSC capacity may be determined. In step 230, the measured exhaust gas constituent level and the exhaust gas constituent storage capacity are compared. The comparison is performed between the exhaust gas constituent level in step 220 and the storage capacity from step 226. In step 232, if the measured exhaust gas constituent level is less than a minimum exhaust gas constituent storage capacity, control proceeds to step 234 to generate a fault signal. The fault signal may be an audible fault signal or a visual fault signal. The fault signal may also be a fault signal stored within the on-board diagnostic system. When the minimum storage capacity is exceeded, step 210 is again performed.

As mentioned above, the actual exhaust gas constituent storage capacity may be determined directly from the oxygen sensor signals or by a time between the transition between the first oxygen sensor 60 and the second oxygen sensor 62. Thus, when the two times are subtracted, a time difference period may be determined and compared to a time difference threshold for determining the oxygen storage capacity. For example, when the time between the transition is short, the oxygen storage capacity of the adsorber is low but when the time between the transition is high or above a threshold, the adsorber may include enough oxygen storage capacity.

Figure 4:
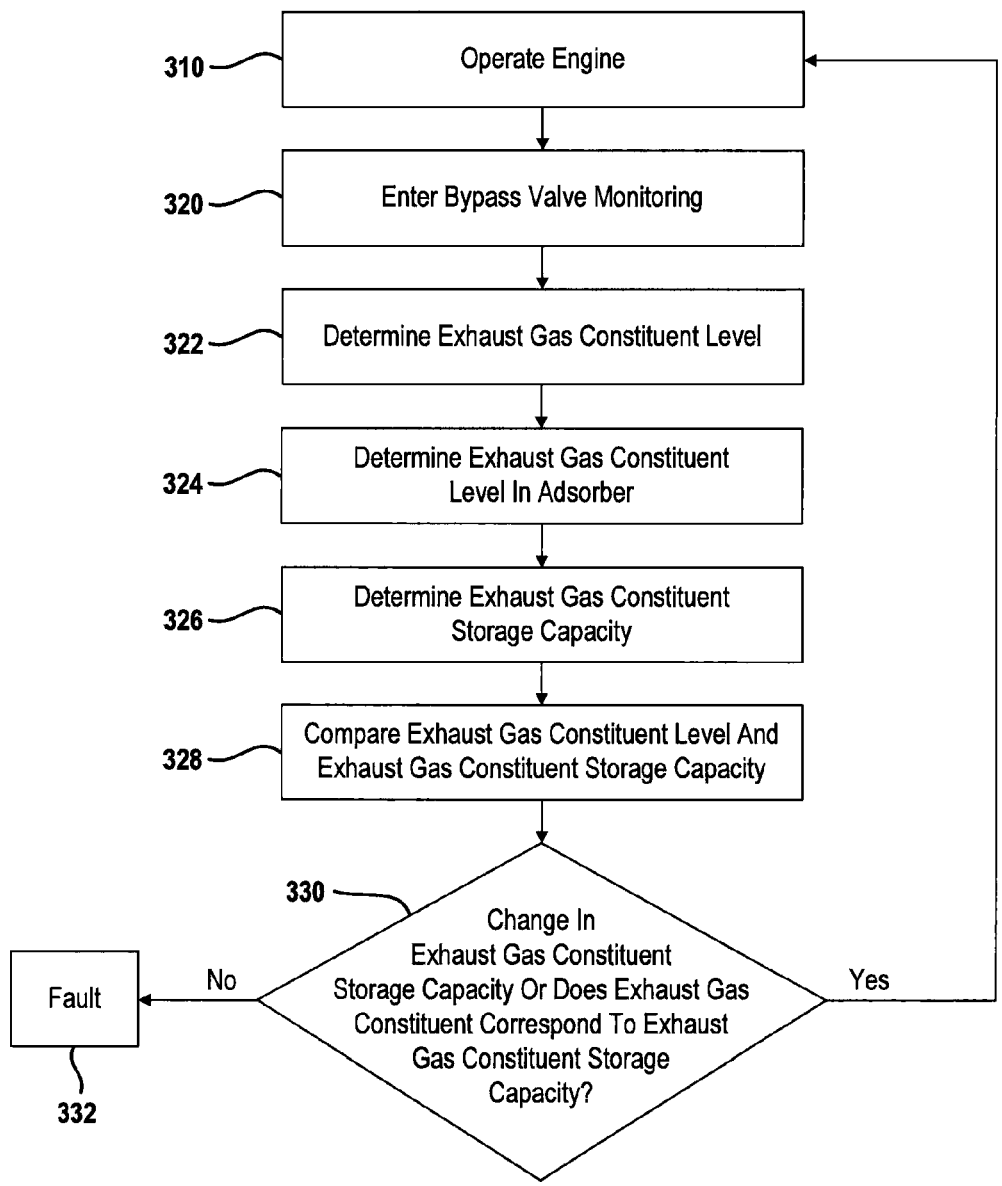
FIG. 4 is a flow diagram depicting a method for monitoring a bypass valve associated with a hydrocarbon adsorber.

Referring now to FIG. 4, a method similar to that described above with respect to FIG. 3 is set forth. In step 310, the engine may be operated in a particular way. As mentioned above, engine operation may be different than that for FIG. 3 in which the adsorber is tested. In the following method, the bypass valve is tested for functionality. Again, the engine may be operated in a particular way such as in a rich mode, lean mode, or a combination of both.

In step 320, a bypass valve monitoring mode is entered. In step 322, the exhaust gas constituent level may be determined from the exhaust gas constituent sensor 60 of FIG. 1. This step is similar to step 222 of FIG. 3. Step 324 determines the exhaust gas constituent level in the adsorber. This step is similar to that of step 224 of FIG. 3. In step 326, the exhaust gas constituent storage capacity of the adsorber is determined. This is similar to step 226 described above in FIG. 3. It should be noted that one or all of the steps 322-326 may be performed to determine whether or not the bypass valve is operating properly. Also, steps 322-326 may be determined at different times such as when the bypass valve is expected to be open and when the bypass valve is expected to be closed under the control of the control module 70. In step 328, the exhaust gas constituent level and the exhaust gas constituent storage capacity may be compared. Again, this is an optional step depending on the type of monitoring chosen.

In step 330, the change in the exhaust gas constituent storage capacity of the adsorber or whether the exhaust gas constituent corresponds to an exhaust gas constituent storage capacity may be determined in step 330. If no change in the exhaust gas constituent storage capacity is achieved when the valve is opened and closed or the exhaust gas constituent does not correspond to an exhaust gas constituent storage capacity, a fault is generated in step 332. If the exhaust gas constituent does correspond to the exhaust gas constituent storage capacity, step 310 may be again performed where the engine is operated until bypass valve functioning is determined.

Figure 5:
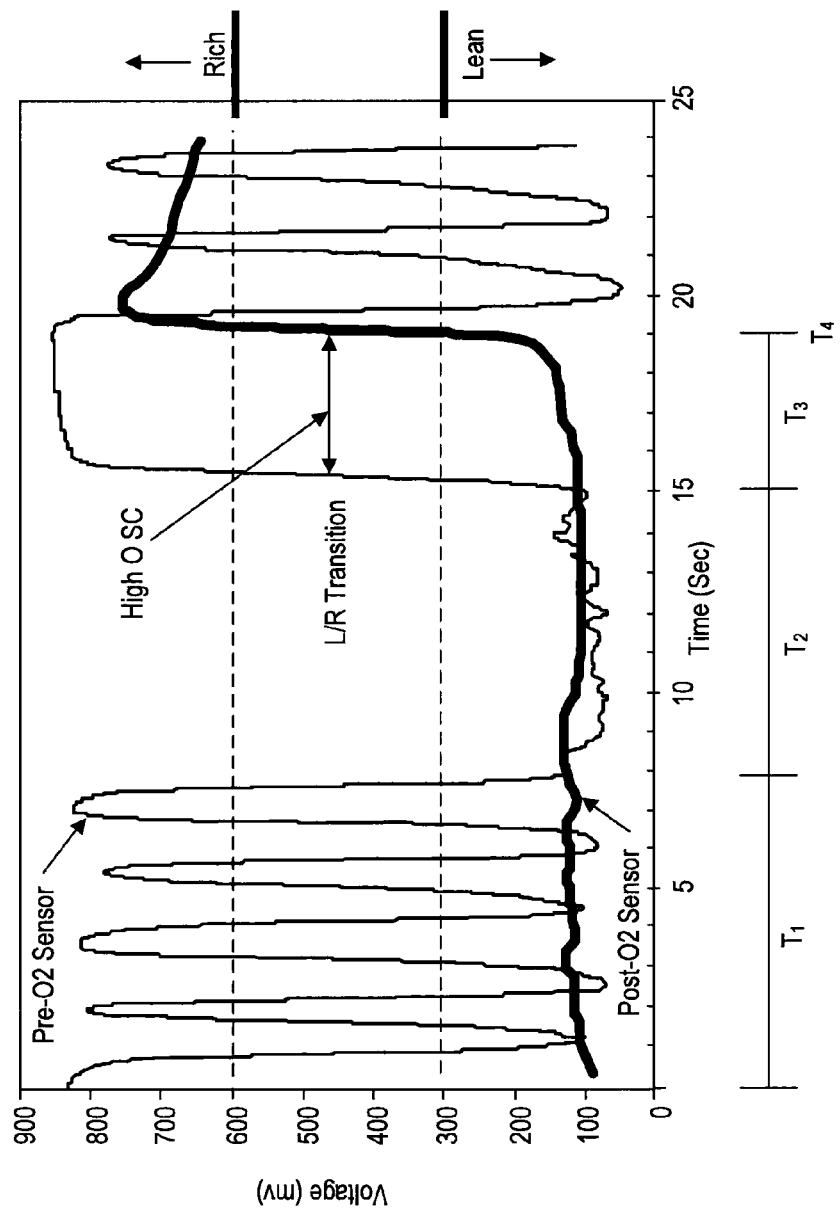
FIG. 5 is a plot of an upstream exhaust gas constituent sensor and a downstream exhaust gas constituent sensor where the adsorber has high exhaust gas constituent storage capacity.

Referring now to FIG. 5, the output of the upstream oxygen sensor (pre-$O_2$ sensor) and the downstream or post-$O_2$ sensor is illustrated. During a first time period T1, the engine is operated stoichiometrically, resulting in an undefined amount of oxygen stored within the adsorber. During time period T2, the engine is operated in a lean state. This allows the adsorber capacity determination to start off at a pre-determined reference level. Between time period T2 and T3, a lean-to-rich transition is performed. The time between the T2-T3 transition and T4 corresponds to the time period T3 which corresponds to the oxygen storage capacity of the adsorber. Thus, a time of the transition between the pre or upstream oxygen sensor transition and the downstream oxygen sensor transition provides the time T3 which directly corresponds to the oxygen storage capacity of the adsorber. It should be noted that operating in a rich state then switching from a rich to lean state may also be used. Running in a rich state will fully deplete the OSC material to a known amount. Either way should be considered equivalents and can performed using the teachings herein.

Figure 6:
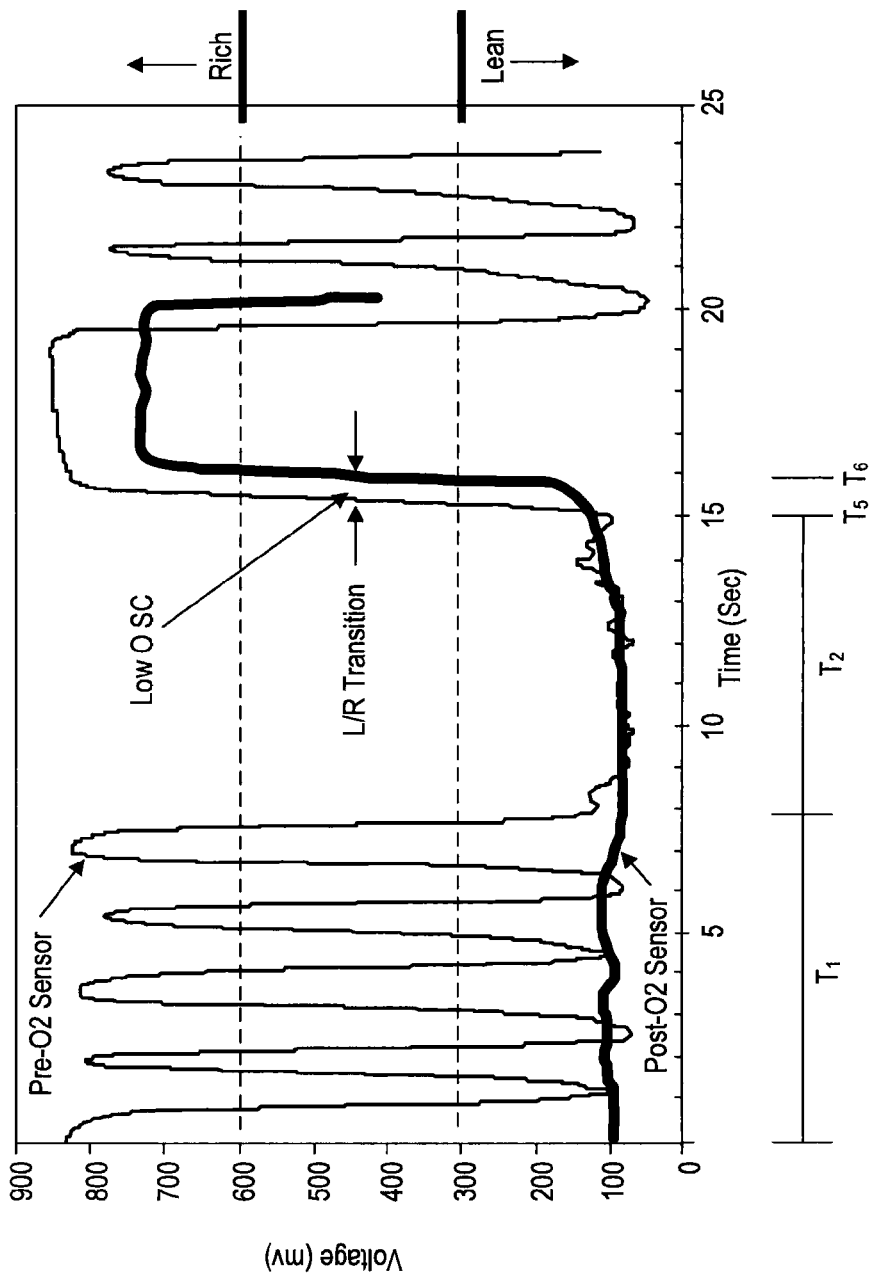
FIG. 6 is a plot of an upstream exhaust gas constituent sensor and a downstream exhaust gas constituent sensor wherein the time between the sensor signals indicates low exhaust gas constituent storage capacity.

Referring now to FIG. 6, the time periods T1 and T2 correspond directly to those illustrated in FIG. 5 and, thus, will not be described further. However, the time period between T5 and T6 is small compared to the time period T3 illustrated in FIG. 5. This small indication of the oxygen storage capacity may indicate that the oxygen storage capacity of the adsorber is reduced and, thus, the adsorber is not operating properly.

Figure 7:
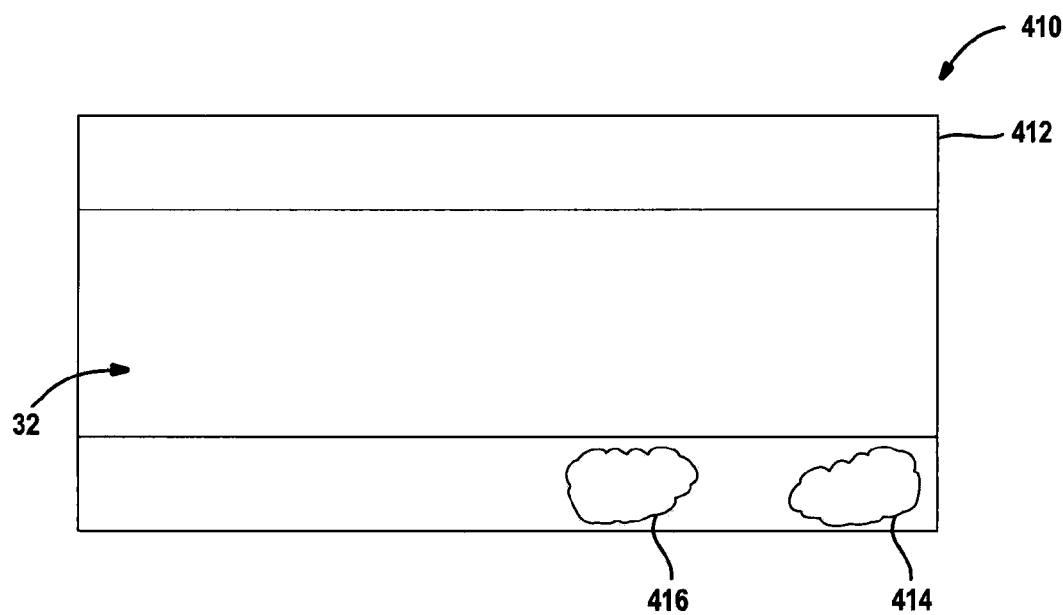
FIG. 7 is a cutaway view of a catalyst according to a first embodiment of the disclosure.

Referring now to FIG. 7, a cutaway view of catalyst 410 is illustrated. The catalyst 410 may be annular in cross-section so that the bypass 32 is formed therethrough. The catalyst 410 includes a catalyst body 412. The catalyst body 412 may have a washcoat thereon. The washcoat may include hydrocarbon (HC) adsorbant material 414 such as zeolite. The hydrocarbon adsorbant material 414 may be applied with the washcoat.

An oxygen storage capacity (OSC) material (or element) 416 may also be disposed on the substrate body 412. The substrate body 412 may include the OSC material 416 within the washcoat. The oxygen storage capacity material may be cerium oxide ($CeO_2$). The OSC material 416 may be designed to degrade at a rate greater than or equal to the zeolite material within the HC adsorbant material 414. Both the hydrocarbon adsorbant material 414 and the oxygen storage capacity material 416 may be applied using a washcoat. The washcoat may apply the hydrocarbon adsorbant material in a uniform layer interspersed with the oxygen storage capacity material 416. The oxygen storage capacity material may be a high surface area cerium oxide particles that are less than 15 nanometers in size. The surface area of the particles may be over 100 $m^2$/g. Trace amounts of metal such as gold, copper, silver or platinum may also be included within the oxygen storage capacity material. The concentrations may be at 1 g/$ft^3$. The additional trace metals may enhance the oxygen storage capacity of the cerium oxide. The oxygen storage capacity material is matched to the deactivation temperatures of the hydrocarbon adsorber materials. The materials may be modified by the addition or deletion of trace amounts of specific metals to alter the temperature ranges where deactivation occurs. The alteration of the temperatures may be performed for various configurations as required by the design process. By using the materials in the adsorber washcoat, emissions correlated diagnostics may be performed as described above. As illustrated above in FIG. 1, pre- and post-oxygen or lambda sensors may be used to measure the oxygen storage which may be used to correlate the hydrocarbon emissions and oxygen storage.

Figure 8:
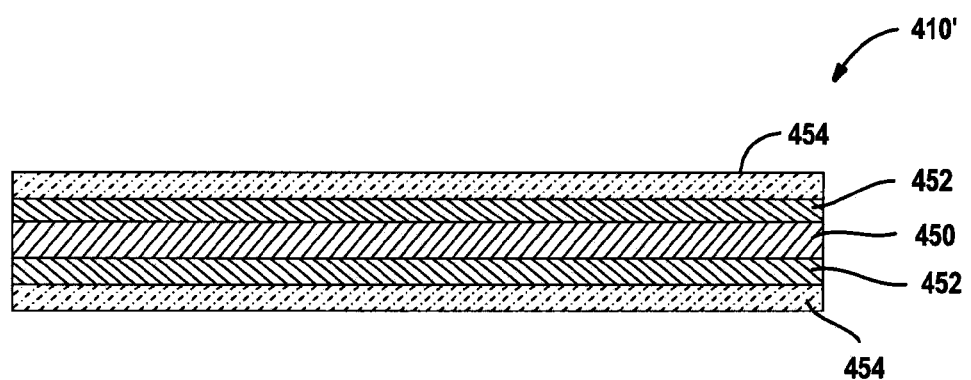
FIG. 8 is a cross-sectional view of a substrate according to a second embodiment of the disclosure.

Referring now to FIG. 8, one method for forming a catalyst 410' includes a substrate 450 that has a first layer 452 disposed on each side thereon. The first layer 452 includes an oxygen storage capacity material. A second layer 454 is disposed on the first layer 452. The second layer 454 includes a hydrocarbon adsorber material. Both the oxygen storage capacity material and the hydrocarbon adsorber material are described above.

The oxygen storage capacity material may improve resistance to hydrocarbon fouling, coking or catalyst poisoning.

Figure 9:
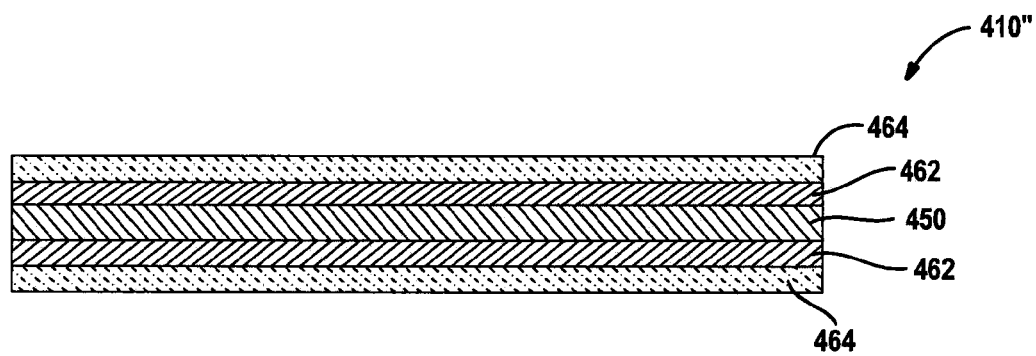
FIG. 9 is a cross-sectional view of a second substrate according to a second embodiment of the disclosure.

Referring now to FIG. 9, an embodiment similar to that illustrated in FIG. 8 is illustrated. In this example, the catalyst 410" includes a substrate 450 as illustrated above. In this example, an HC adsorber coating 462 is applied to each side of the substrate 450. An oxygen storage capacity layer 464 is applied to each HC adsorber coating material layer.

Figure 10:
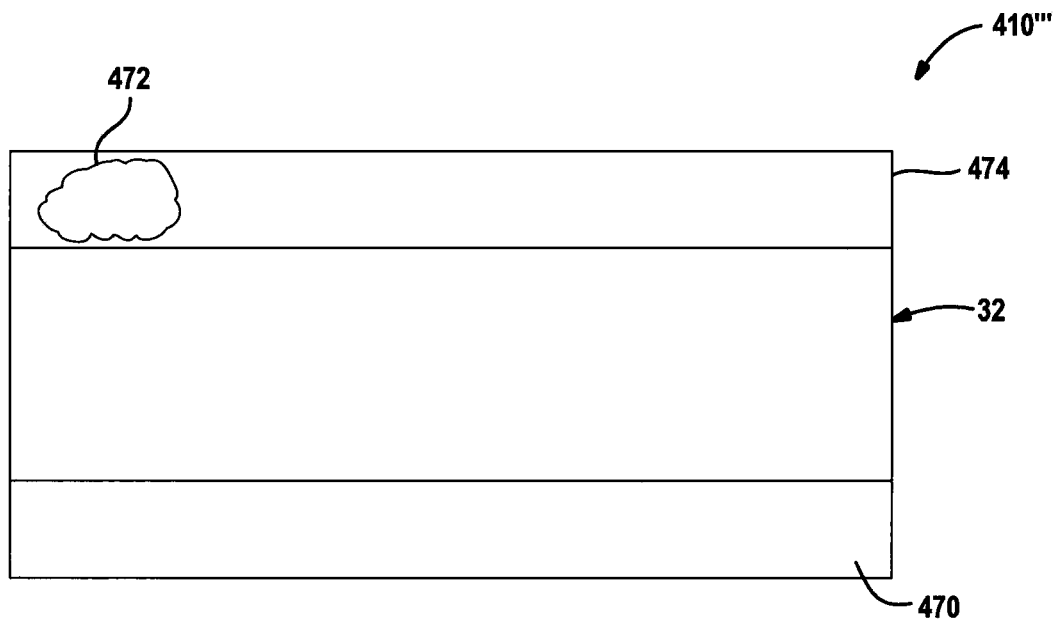
FIG. 10 is a cutaway view of a catalyst according to a fourth embodiment of the disclosure.

Referring now to FIG. 10, the catalyst 410''' is illustrated having a hydrocarbon adsorber material 470 disposed within a washcoat. An overcoat or zone coat 472 disposed toward the front or exhaust-receiving portion (toward the engine) of the catalyst body 474 is illustrated. This allows the oxygen storage capacity material to be disposed in a location as required. The zone coat 472 may be applied after the washcoat.

Figure 11:
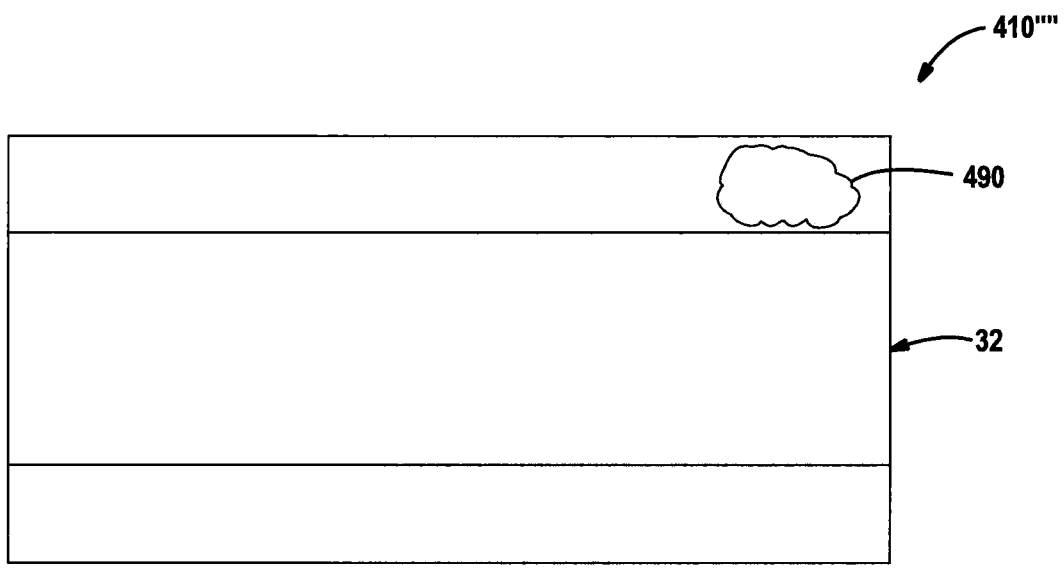
FIG. 11 is a cutaway view of a catalyst according to a fifth embodiment of the disclosure.

Referring now to FIG. 11, an oxygen storage capacity zone 490 is illustrated toward the rear or outlet portion of the catalyst 410''''. In this embodiment the increased oxygen storage capacity may be placed toward the rear of the catalyst 410'''' (toward a tail pipe).

Figure 12:
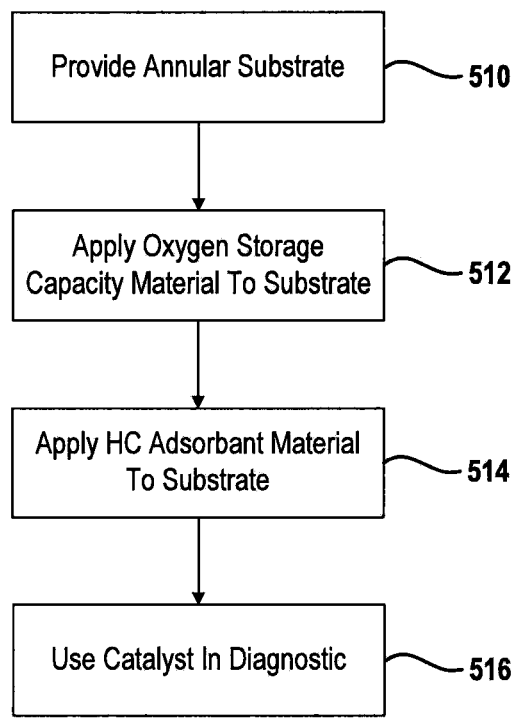
FIG. 12 is a flowchart of a method for forming a catalyst according to the disclosure.

Referring now to FIG. 12, a method for forming a catalyst is set forth. In step 510, an annular substrate is provided. The annular substrate is formed so that a bypass channel 32 is formed therein. In step 512, oxygen storage capacity material is applied to the substrate. The oxygen storage capacity material may be applied in a washcoat or in zones on the substrate material.

In step 514, hydrocarbon adsorbant material is also applied to the substrate. Both the hydrocarbon adsorbant material and the oxygen storage capacity material may be applied simultaneously within a washcoat. Further, the hydrocarbon adsorbant material may be applied to the substrate prior to the oxygen storage capacity material or after the application of oxygen storage capacity material.

After the hydrocarbon adsorbant material and the oxygen storage capacity material are applied to the substrate, the catalyst is used in the diagnostic method as described above.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A system comprising:
  a catalyst body configured to receive an exhaust gas from an engine;
  a hydrocarbon adsorber disposed on or within the catalyst body, wherein the hydrocarbon adsorber is configured to have a first degradation rate at temperatures greater than a predetermined temperature at which the adsorber begins to degrade; and
  an oxygen storage element disposed on or within the catalyst body, wherein the oxygen storage element comprises oxygen storage material, wherein the oxygen storage material is configured to have a second degradation rate at the temperatures greater than the predetermined temperature, and wherein the second degradation rate is greater than or equal to the first degradation rate.

2. A system as recited in claim 1, wherein the hydrocarbon adsorber and the oxygen storage element are disposed within a washcoat of the catalyst body.

3. A system as recited in claim 2, wherein the catalyst body comprises a substrate, wherein the washcoat is disposed on the substrate.

4. A system as recited in claim 3, further comprising:
  a first layer disposed directly on the substrate; and
  a second layer disposed on the first layer.

5. A system as recited in claim 4, wherein:
  the first layer comprises the hydrocarbon adsorber; and
  the second layer comprises the oxygen storage element.

6. A system as recited in claim 4, wherein:
  the first layer comprises the oxygen storage element; and
  the second layer comprises the hydrocarbon adsorber.

7. A system as recited in claim 3, wherein the hydrocarbon adsorber is disposed on an inlet portion of the catalyst body and upstream from the oxygen storage element.

8. A system as recited in claim 3, wherein the oxygen storage material comprises cerium oxide ($CeO_2$), wherein the $CeO_2$ is dispersed uniformly within the washcoat.

9. A system as recited in claim 1, wherein the oxygen storage material is dispersed non-uniformly within a washcoat of the catalyst body.

10. A system as recited in claim 1, wherein the oxygen storage material is disposed on an outlet portion of the catalyst body and downstream from the hydrocarbon adsorber.

11. A system as recited in claim 1, wherein the catalyst body has an annular cross section.

12. A system as recited in claim 1, wherein:
  the hydrocarbon adsorber comprises zeolite; and
  the oxygen storage material comprises cerium oxide and degrades at a rate faster than or equal to the zeolite.

13. A system as recited in claim 1, wherein the oxygen storage material:
  comprises particles;
  each of the particles has a surface area of a size less than a first predetermined surface area; and
  the surface area, of the particles as disposed on or within the catalyst body, is greater than a second predetermined surface area per a predetermined number of grams of the particles.

14. A system as recited in claim 1, wherein:
  the oxygen storage element comprises metal elements; and
  a concentration of the metal elements in the catalyst body is less than a predetermined number of grams per cubic foot.

15. A system as recited in claim 14, wherein the metal elements comprise at least one of copper, gold, silver and platinum.

16. A system as recited in claim 14, wherein:
  the concentration of the metal elements is set such that a deactivation temperature of the oxygen storage element is matched to a deactivation temperature of the hydrocarbon adsorber; and
  the deactivation temperature of the hydrocarbon adsorber is a temperature above which performance of the hydrocarbon adsorber begins to degrade.

17. A system as recited in claim 1, wherein the hydrocarbon adsorber and the oxygen storage element begin to degrade at the predetermined temperature.

18. A system as recited in claim 1, further comprising:

a first constituent determination module that determines an oxygen level within the exhaust gas;

a second constituent determination module that determines an amount of exhaust gas constituent within the hydrocarbon adsorber;

a storage capacity module that determines a storage capacity of the hydrocarbon adsorber based on the amount of exhaust gas constituent within the hydrocarbon adsorber or a time period associated with a lean-to-rich transition of an air fuel ratio of the engine; and a comparison module that generates a fault signal based on the oxygen level within the exhaust gas and at least one of the amount of exhaust gas constituent within the hydrocarbon adsorber and the storage capacity, wherein the fault signal indicates that the storage capacity of the hydrocarbon adsorber is less than a minimum storage capacity.

19. A system as recited in claim 18, further comprising:

a first sensor positioned upstream from the catalyst body, wherein the first sensor generates a first signal indicative of the oxygen level within the exhaust gas; and a second sensor connected to the catalyst body, wherein the second sensor generates a second signal indicative of the amount of exhaust gas constituent in the hydrocarbon adsorber, wherein the first constituent determination module determines the oxygen level within the exhaust gas based on the first signal, and wherein the second constituent determination module determines the amount of exhaust gas constituent in the hydrocarbon adsorber based on the second signal.

20. A system as recited in claim 19, wherein:

the storage capacity module determines the storage capacity of the hydrocarbon adsorber based on the time period associated with a lean-to-rich transition of the air fuel ratio of the engine; and the time period associated with the lean-to-rich transition starts when the first sensor transitions from indicating a lean mode to indicating a rich mode, and ends when the second sensor transitions from indicating a lean mode to indicating a rich mode.

21. A system as recited in claim 18, wherein:

the second constituent determination module determines an oxygen level within the hydrocarbon adsorber;

the storage capacity module that determines an oxygen storage capacity of the hydrocarbon adsorber based on the oxygen level within the hydrocarbon adsorber or the time period associated with the lean-to-rich transition of the air fuel ratio of the engine;

the comparison module that generates the fault signal based on the oxygen level within the exhaust gas and at least one of the oxygen level within the hydrocarbon adsorber and the oxygen storage capacity; and the fault signal indicates that the oxygen storage capacity of the hydrocarbon adsorber is less than a minimum oxygen storage capacity.

* * * * *